United States Patent [19]
Kishi et al.

[11] Patent Number: 4,992,127
[45] Date of Patent: Feb. 12, 1991

[54] PROCESS FOR PREPARING FIBER-REINFORCED THERMOPLASTIC MOLDED ARTICLES USING NOTCHED PREPREG CONTAINING CONTINUOUS FIBER

[75] Inventors: Satoru Kishi, Tokyo; Hideo Sakai, Kanagawa, both of Japan

[73] Assignee: Mitsui Toatsu Chemicals, Inc., Tokyo, Japan

[21] Appl. No.: 351,534

[22] Filed: May 15, 1989

[30] Foreign Application Priority Data

May 17, 1988 [JP] Japan ................................ 63-118364

[51] Int. Cl.$^5$ ............................................. B32B 31/00
[52] U.S. Cl. ................................... 156/182; 156/222; 156/252; 156/257; 264/154; 428/136
[58] Field of Search ............... 156/182, 252, 222, 257; 428/136; 264/154

[56] References Cited

U.S. PATENT DOCUMENTS

| | | | |
|---|---|---|---|
| 3,968,287 | 7/1976 | Balk | 156/257 |
| 4,563,232 | 1/1986 | Peake | 156/182 |
| 4,732,636 | 3/1988 | Varker | 428/136 |

Primary Examiner—John J. Gallagher
Attorney, Agent, or Firm—Burns, Doane, Swecker & Mathis

[57] ABSTRACT

The present invention relates to a process for preparing molded articles of fiber-reinforced thermoplastic resin (FRTP) by conducting laminated molding of:

(a) prepregs comprising woven reinforcing fibers impregnated with thermoplastic resin and containing at least one notch, and
(b) sheet prepreg comprising unidirectionally arranged reinforcing fibers impregnated with thermoplastic resin and containing at least one notch in a direction traversing the unidirectionally arranged fibers. The molded articles of FRTP obtained by the process of this invention are high quality products free from warpage, torsion and uneven strength.

14 Claims, 2 Drawing Sheets

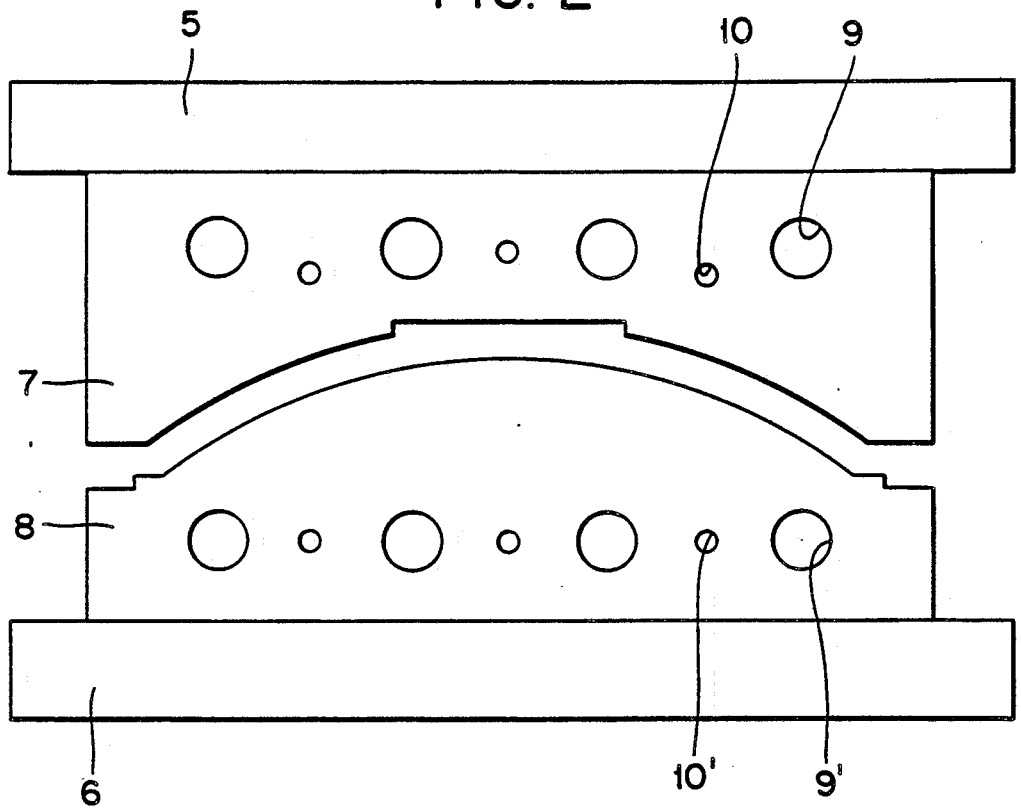

PROCESS FOR PREPARING FIBER-REINFORCED THERMOPLASTIC MOLDED ARTICLES USING NOTCHED PREPREG CONTAINING CONTINUOUS FIBER

BACKGROUND OF THE INVENTION a. Field of the Invention

The present invention relates to a process for preparing molded articles of fiber-reinforced thermoplastics (hereinafter abbreviated as FRTP).

b. Description of the Prior Art

Conventionally known FRTP which contains a thermoplastic resin as a matrix material is reinforced with short fibers having a fiber length of no greater than 1 mm, or with continuous strands of mat.

FRTP containing a thermoplastic resin as a matrix material and reinforced with short fibers having a fiber length of no greater than 1 mm has good fiber flowability and hence is widely used for injection molding materials. The molded products produced have good appearance but poor strengths.

FRTP containing a thermoplastic resin as a matrix material and reinforced with continuous strands of mat has poor fiber flowability and hence is used for stamp molding materials which are primarily used for the molding almost flat forms. The molded forms have poor appearance and high strengths.

A new material having combined characteristics of the above two materials has recently been developed. The new material has good fiber flowability and provides both good appearance and high strengths to the molded products. In processing the new material, strands or yarns are cut into a length of about 2.5 mm. The resulting chopped strands or chopped yarns are stacked to a desired shape and molded by below described press molding, autoclave molding or stamp molding.

However, FRTP containing the chopped strands or the chopped yarns inevitably generates non-uniform fiber flow or orientation of fiber, which leads to scattering of strengths and warpage or torsion of molded products. Thus, FRTP has many problems with respect to reliability when used for structural materials.

Chopped strand mats and chopped yarns useful for stamp molding have been disclosed. Woven textiles, however, cannot be applied to the reinforcing fiber in the stamp molding process. Woven textiles are different from chopped strands or chopped yarns and have almost no degree of freedom with respect to fiber flowability, and hence uniform filling of the mold is inhibited. When the shape of the molded products, i.e. the configuration of the cavity in the mold, is similar to a plate, stamp molding, press molding or autoclave molding can also be applied. However, in three-dimensional configurations such as curved surfaces, partial overlapping of the woven textiles occurs during the molding process, thereby causing an excess of fiber and a decrease in strength in the overlapped portion.

SUMMARY OF THE INVENTION

The present invention overcomes the problems and disadvantages of the prior art by providing a process for preparing high quality molded articles of FRTP.

It is an object of the invention to provide a process for preparing high quality molded articles of FRTP that exhibit good flowability in the molding operation, inhibit short shot and eliminate warpage, torsion or uneven strength of the molded articles due to non-uniform flow of the reinforcing fiber even in the molding of complicated three-dimensional configurations.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a process for preparing fiber-reinforced thermoplastic articles comprising:

at least one prepreg A comprising a woven reinforcing fiber impregnated with a thermoplastic resin and containing at least one notch, and at least one sheet prepreg B comprising unidirectionally arranged reinforcing fiber impregnated with a thermoplastic resin and containing at least one notch in a direction traversing said fiber; and molding said prepregs to form a fiber-reinforced thermoplastic article.

The accompanying drawings, which are incorporated in and constitute a part of this specification, illustrate several exemplary embodiments of the invention and together with the description, serve to explain the principles of the invention.

BRIEF DESCRIPTION OF THE DRAWINGS

FIG. 2 illustrates a mold used for stamp molding in examples and comparative examples.

DESCRIPTION OF THE PREFERRED EMBODIMENTS

Figure 1A:
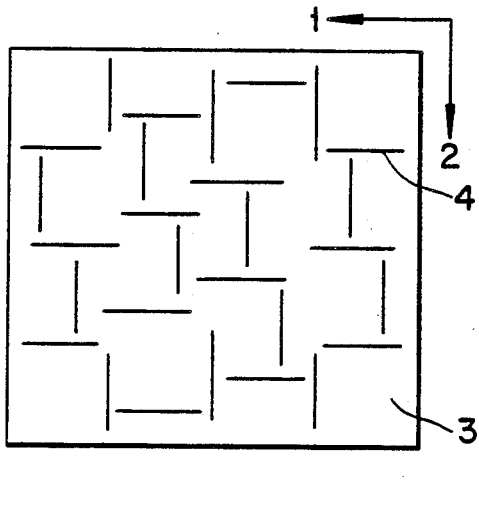
FIG. 1, from (a) to (d) illustrate various examples on the pattern of the notches in this invention.

Reference will now be made in detail to the present preferred embodiments of the invention, examples of which are illustrated in the accompanying drawings.

Exemplary suitable thermoplastic resins for use in the process of this invention include polystyrene, polypropylene, polyethylene, AS resin, ABS resin, ASA resin (polyacrylonitrile-polystyrene-polyacrylate resin), polymethyl methacrylate, nylon, polyacetal, polycarbonate, polyethylene terephthalate, polybutylene terephthalate, polyphenylene oxide, fluoro resin, polyphenylene sulfide, polysulfone, polyether sulfone, polyether ketone, polyether ether ketone, polyimide and polyacrylate.

Exemplary reinforcing fibers suitable for use in the process of the invention include glass fibers, carbon fibers, aramid fibers, and silicon carbide fibers.

An exemplary suitable unidirectionally arranged reinforcing fiber for use in the process of the invention is prepared by unidirectionally arranging from about 100 to 200 rovings per 100 to 200 mm width rovings which are obtained by bundling from about 3000 to about 12,000 monofilaments having a diameter of from about 3 to about 15 $\mu$m.

Yarns suitable for use in preparing the woven textile of this invention are prepared by bundling from about 200 to 12,000 monofilaments having a diameter of from about 3 to 15 $\mu$m, i.e. a tex of approximately from about 16.8 to 1000. The thread count is generally from about 5 to 80 yarns per 25 mm width of the woven textile.

Weaving includes plain weave, satin weave and diagonal weave.

When glass fibers are used for preparing woven textile, the binding agent is removed by heat cleaning and the resultant textile is then treated with a coupling agent based on silane, titanate or zirconium.

When glass fibers are used for reinforcing the resin, the most suitable coupling agent must be selected in accordance with the resin to be combined. Practical examples will be illustrated below.

Exemplary suitable coupling agents for nylon resins include γ-aminopropyl-trimethoxysilane and N-(β-aminoethyl)-γ-aminopropyl-trimethoxysilane.

Exemplary suitable coupling agents for polycarbonate resins include γ-aminopropyl-trimethoxysilane and N-(β-aminoethyl)-γ-aminopropyl-trimethoxysilane.

Exemplary suitable coupling agents for polyethylene terephthalate or polybutylene terephthalate include β-(3,4-epoxycyclohexyl)ethyltrimethoxysilane, γ-glycidoxypropyl-trimethoxysilane and γ-aminopropyl-trimethoxysilane.

Exemplary suitable coupling agents for polyethylene or polypropylene include vinyltrimethoxysilane, vinyl-tris(2-methoxyethoxy)silane and γ-methacryloxypropyltrimethoxysilane.

The above coupling agents can be used for polyphenylene oxide, polyphenylene sulfide, polysulfone, polyether sulfone, polyether ketone or fluoro resin. Other coupling agents such as N-(β-aminoethyl)-γ-aminopropyl-methyldimethoxysilane, γ-chloropropyl-methyldimethoxysilane, γ-mercaptopropyl-trimethoxysilane and p-aminophenyl-triethoxysilane are also suitable for use in the process of the invention.

When fibers other than the glass fiber are used, the fibers are often treated with an amine curing type epoxy resin as a coupling agent. Exemplary epoxy resins suitable for use in the treatment include bisphenol-A-epoxy resins, epoxy-novolac resins, alicyclic epoxy resins, aliphatic epoxy resins, glycidyl ester type resins and brominated epoxy resins.

The coupling agents may be applied to the surface of the fiber by the following method:

The bundling agent is removed from the fiber. The residual fiber is completely impregnated with a solution containing from about 0.1 to 3% by weight of a coupling agent for example by dipping, spraying and coating.

The fiber impregnated with the coupling agent solution is dried at a temperature of from about 60° to 120° C. to carry out reaction of the coupling agent with the surface of the fiber. The time required for complete evaporations of the solvent is sufficient for the reaction to occur and is approximately from about 15 to about 20 minutes.

The solvent for dissolving the coupling agent is selected in accordance with a surface treating agent to be employed. In some cases, water is used, after adjusting the pH to a range of approximately from about 2.0 to about 12.0. In other cases, organic solvents such as ethanol, toluene and xylene are used singly or in combination.

Various methods may be employed for preparing a prepreg by impregnating the woven fiber or the unidirectionally arranged fiber with the thermoplastic resin. The most popular methods are described below.

One method that may be employed when the resin is soluble in the solvent is dissolving. The resin in the solvent impregnating the fiber with the resultant resin solution, and then removing the solvent with defoaming to obtain the prepreg.

In another method, the resin may be heated to produce a fused resin. The fiber is then impregnated with the fused resin, and then the applied resin is defoamed and cooled to produce the prepreg.

The prepreg thus obtained may be notched by the following method. For example, fine grooves can be engraved on a base plate to fix the blades in the same pattern as that of the notch. A so-called blanking-die having cutting-edges built in grooves can be prepared. The blanking-die can be mounted on a crank press or a hydraulic press. The prepreg can be placed under the blanking-die and punched. Satisfactory notching requires only a depth to completely cut the woven textile or the unidirectionally arranged fiber. Consequently, the notch may penetrate the prepreg but the undersurface portion of the resin need not be cut so long as the fiber is completely divided.

When the above treatment is carried out on a large scale, the cutting-edges are mounted in a revolving roller. The roller and a rubber roll are paired and the revolving roller is rotated. The prepreg is then passed between the rubber roll and the bladed roller. By this method, the prepreg can be continuously notched.

An example of the length and position of the notch in the prepreg A containing the woven textile will be described below.

The length and numbers of the notch cannot generally be determined because the size of the prepreg is changed according to the molded article desired. For example, desired length of the notches is not more than half the maximum length of the prepreg and the desired number of notches is 1100 or less per square meter of the prepreg.

When the notch length and numbers exceed the above values, the woven textile sometimes tears during the molding process and the advantage of the invention cannot be achieved.

The notches must be set to prevent mutual intersection and the portion surrounded by the notch must be protected from dislodgement.

Figure 1B:
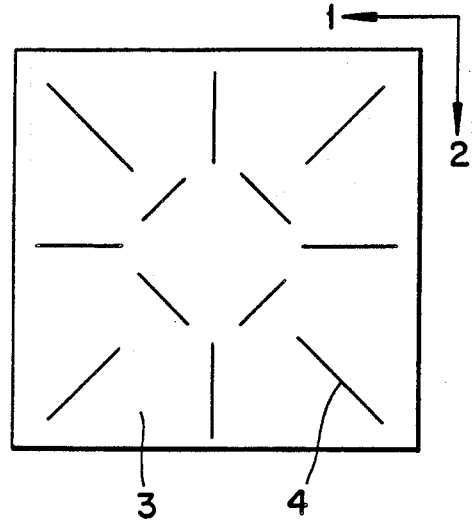

FIGS. 1(a) and 1(b) illustrate notch patterns on the prepreg of the woven textile.

FIG. 1(a) illustrates an example of the notches 4 which are set in two directions (in the warp direction 2 of the woven textile and in the weft direction 1) which have a depth sufficient to cut the woven textile in the prepreg 3 do not intersect each other.

FIG. 1(b) illustrates notches 4 which are set in four directions (in the warp direction 2 of the woven textile, in the weft direction 1 and in the two directions making an angle of 45 degrees to the directions of warp and weft respectively), and have a depth sufficient to cut the woven textile of the prepreg 3 and do not intersect each other.

Examples of the length and position of the notch on the unidirectionally reinforced sheet prepreg B will hereinafter be described by way of drawings.

Figure 1C:
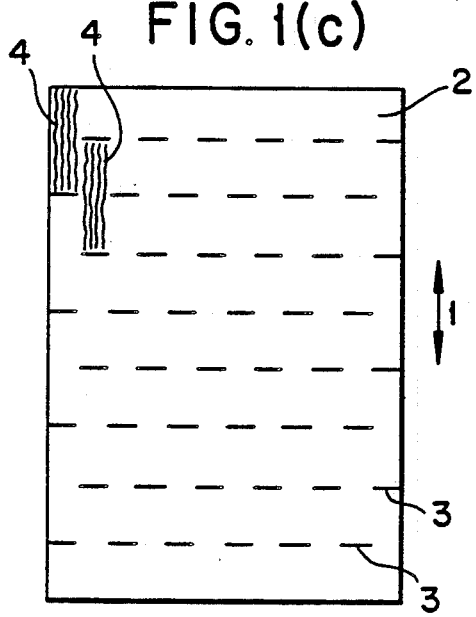
Figure 1D:
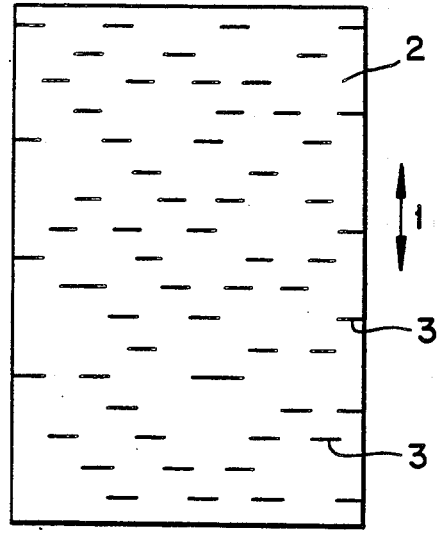

FIGS. 1(c) and 1(d) are plan views illustrating notch patterns on the prepreg B of the invention.

The direction 1 of the reinforcing fiber in the unidirectionally reinforced sheet prepreg 2 is indicated by an arrow. A large number of the notches 3 are set on the prepreg 2. For example, in FIG. 1(c), the notch 3 is regularly arranged like a broken line or a staircase. Each length of divided reinforcing fiber constitutes the long side of a uniform rectangular prepreg fragment 4 having a prescribed dimension.

FIG. 1(d) illustrates an irregularly notched prepreg in which the effects of this invention can be observed. The effects can be further enhanced when the following conditions are satisfied.

The conditions are that the notches have a length of from 2 to 10 mm, and form rows having a notch to notch spacing of from 2 to 30 mm in the direction of the notches.

The rows are spaced in intervals of from about 5 to 100 mm. The length and patterns of the notches may be selected in view of the above ranges to be most effective for the filling ability of the prepreg 3 and flowability of the fiber.

On stacking the prepreg A and prepreg B in the process of this invention, plies and stacking order of the prepreg used are not restricted and may be selected in accordance with the properties required for the FRTP articles. A desired method is alternative stacking of the prepreg A and the prepreg B.

On stacking a plurality of the notched prepregs in the process of this invention, it is preferable to overlap the upper and the lower prepregs so that the notches on each prepreg do not coincide with each other.

To prevent warpage and torsion of the molded article, it is preferable to stack the upper and lower prepregs so that the fiber in each prepreg has the same stacking direction to the center of wall thickness of the molded article. In other words, the direction of fiber in each prepreg is in a relation constituting mirror images of each other against the center face of wall thickness of the molded article.

In view of strength performance required for the molded articles, no restriction is imposed on stacking larger plies of the unidirectionally arranged prepregs to the direction requiring higher strengths.

Molded articles of FRTP having isotropic strength in the horizontal direction are prepared by stacking prepreg A and prepreg B in a manner such that the direction of the fiber in each prepreg is respectively shifted, for example, by 45 degrees to disperse the direction. On the other hand, when the strength of the molded articles is required for one direction alone, the fiber of the prepreg is arranged in one direction in the stacking process.

It is more effective to stack the prepreg so that overlapping of the notch is avoided on each mutually contacting prepreg. For example, each layer can be gradually displaced in every direction, i.e., shifted clockwise or counterclockwise in a definite angle in the stacking process.

The laminate thus obtained is molded in the next step. A stamp molding process which is a high-speed molding process can be used in the invention. In that process, the laminate is heated in an oven above the flowable temperature of the resin. Then the hot laminate thus obtained or a FRTP plate obtained by the above molding process is placed in a press tool that has been heated at a temperature no greater than about the glass transition temperature of the resin. The press tool is clamped within a short time, and shaping, defoaming, and cooling are carried out at the same time.

Another process which may be employed for molding in the process of the invention is a press molding process. In that process, the laminate is placed in a mold which is mounted on a press and heated above the flowable temperature of the resin. The laminate is pressed for from about 10 seconds to about 60 minutes under heating at a pressure of from about 1 to about 300 kg per 1 $cm^2$ of surface area of the molded article. The mold is then cooled and the molded article is released from the mold.

A further molding process suitable for use in this invention is an autoclave molding process. In that process, the laminate is heated in a vacuum above the flowable temperature of the resin, subjected to defoaming and shaping at a pressure of no greater than about 20 $kg/cm^2$, and cooled to below the glass transition temperature of the resin. The molded article is then released from the mold.

The process of the invention further includes a process for applying the above laminate or FRTP obtained by the above molding process to a reinforcing material of injection molded products. In the process, the laminate or FRTP is previously inserted into a mold and integrated with an injection molding resin.

Notching the prepreg does not deteriorate the quality of the products, particularly the strengths of the molded articles.

The FRTP molded articles obtained by the process of the invention are useful for preparing structural materials requiring strengths and large performance members.

Exemplary items include back-up beams of automotive bumpers, impact beams of automotive doors, automotive floor panels, oil pans of automotive engines and panels of water storage tanks.

EXAMPLES

The present invention will be further clarified by the following examples and comparative examples, which are intended to be purely exemplary of the invention.

The prepreg employed in the following examples and comparative examples was prepared by the method described in Japanese Patent Laid-Open No. 229535/1986. A sheet prepreg which was prepared by bringing a plurality of tension-traveled continuous fibers into contact with a resin film adhered roll was employed. Table 1 illustrates the matrix resins and reinforcing fibers which were used for the prepreg, and the volume content (Vf) of the reinforcing fibers. Glass cloth and carbon cloth were subjected to the following pretreatment prior to impregnation with the resin.

PRETREATMENT OF GLASS CLOTH

Glass cloth H-201 FT ™ (a product of Unitica) was subjected to heat cleaning at 400° C. for 10 hours. The cloth was then passed through a 0.3% by weight aqueous solution of γ-aminopropyl-trimethoxysilane and successively dried at a temperature of from 100° to 110° C. for 10 minutes to produce treated glass cloth.

PRETREATMENT OF CARBON CLOTH

Carbon cloth #6343 ™ (a product of Toray Industries) was washed by dipping in acetone, air-dried at room temperature and further dried at 100° C. for 10 minutes to produce treated carbon cloth.

EXAMPLE 1

Prepreg A1 and prepreg B1 were cut into squares having sides of 300 mm.

A blanking-die having a cutting-edge pattern illustrated in FIG. 1(a) was mounted on a hydraulic press.

The square-cut prepreg A1 was placed on the blanking-die and punched to make notches having a depth sufficient to cut the fiber in the prepreg A1.

The notched pattern was composed of notches having a length of respectively 40 mm, 50 mm and 60 mm in the two directions of the woven textile (in the weft direction 1 and in the warp direction 2).

The square-cut prepreg B1 was also notched by the same procedures as described in prepreg A1 to give a notched pattern illustrated in FIG. 1(c). The notched pattern had a notch length of 5 mm, an interrow interval of 12.5 mm and a notch depth completely cutting the fiber in the prepreg B1.

A laminate was prepared by stacking 20 piles of the notched prepreg shifted by an angle of each 45 degrees in the following sequence from the top:

[prepreg A1 (0°)/prepreg B1 (0°)
/prepreg A1 (45°)/prepreg B1 (45°)
/prepreg A1 (90°)/prepreg B1 (90°)
/prepreg A1 (135°)/prepreg B1 (135°)
/prepreg A1 (180°)/prepreg B1 (180°)
/prepreg B1 (180°)/prepreg A1 (180°)
/prepreg B1 (135°)/prepreg A1 (135°)
/prepreg B1 (90°)/prepreg A1 (90°)
/prepreg B1 (45°)/prepreg A1 (45°)
/prepreg B1 (0°)/prepreg A1 (0°)]

The resultant laminate was preheated in a hot-air circulating drier at 270° C. for 5 minutes.

A metal mold having an upper mold holder 5, bottom mold holder 6, upper mold body 7 having a 180 R sphere-cavity the depth of which is 38 mm, lower mold body 8 having a 178 R sphere-swell corresponding said cavity, upper mold heater 9, bottom mold heater 9', upper mold temperature measuring hole 10 and bottom mold temperature measuring hole 10' as illustrated in FIG. 2 was used for stemp molding a hemiballoon article.

The mold was heated to 120° C. and the above laminate which was preheated at 270° C. was placed in the mold, the mold was clamped within 10 seconds, dwelled for a minute with 40 tons of pressure loading and then the mold was opened to remove the molded article which had a wall thickness of 3 mm.

The molded article obtained had a uniform dispersion of fiber and resin and also had good appearance.

EXAMPLE 2

Prepreg A2 and prepreg B2 were cut into squares having a side of 300 mm.

A blanking-die having a cutting-edge pattern illustrated in FIG. 1(b) was mounted on a hydraulic press.

The square-cut prepreg A2 was placed on the blanking-die and punched to make notches having a depth cutting the fiber in the prepreg A2.

The notched pattern was composed of notches having a length of respectively 40 mm, 65 mm and 100 mm in the four directions of the woven textile (in the weft direction 1:40 mm, in the warp direction 2:65 mm, and in directions making an angle of 45 degrees to the directions of the warp and weft respectively:100 mm).

The square-cut prepreg B2 was also notched by the same procedures as described for prepreg A2 to give a notched pattern illustrated in FIG. 1(d). The notched pattern had a notch length of 5 mm, an arbitrary inter-notch spacing in the range of 5×n mm (n=1, 2 or 3), an arbitrary interrow interval ranging from 5 to 8 mm and a notch depth completely cutting the fiber in the prepreg B2.

A laminate was prepared by stacking 24 piles of the notched prepreg shifted by an angle of each 120 degrees in the following sequence from the top:

[prepreg A2 (0°)/prepreg B2 (0°)
/prepreg A2 (120°)/prepreg B2 (120°)
/prepreg A2 (240°)/prepreg B2 (240°)
/prepreg A2 (0°)/prepreg B2 (0°)
/prepreg A2 (120°)/prepreg B2 (120°)
/prepreg A2 (240°)/prepreg B2 (240°)
/prepreg B2 (240°)/prepreg A2 (240°)
/prepreg B2 (120°)/prepreg A2 (120°)
/prepreg B2 (0°)/prepreg A2 (0°)
/prepreg B2 (240°)/prepreg A2 (240°)
/prepreg B2 (120°)/prepreg A2 (120°)
/prepreg B2 (0°)/prepreg A2 (0°)]

The resultant laminate was preheated in a hot-air circulating drier at 380° C. for 5 minutes.

A metal mold illustrated in FIG. 2 was used for stamp molding a hemiballoon article.

The mold was heated to 200° C. The above preheated laminate of the prepreg was placed in the mold, the mold was clamped within 10 seconds, dwelled for a minute with 60 tons of pressure loading and then the mold was opened to remove a molded article having a wall thickness of 3.6 mm.

The molded article obtained had a uniform dispersion of fiber and resin and also had good appearance.

COMPARATIVE EXAMPLE 1

A molded article was obtained by carrying out the same procedures as described in Example 1 except that prepregs were used without making notches.

In the periphery of the molded article, the woven textile was overlapped in a part where almost no resin was found and the glass fiber caused whitening.

On the other hand, at the convex portion around the center of the molded article, uniform dispersion of the unidirectionally arranged fibers was disturbed and the amount of the resin was in excess in some portions. Consequently, the molded article was a defective unit.

COMPARATIVE EXAMPLE 2

A molded article was obtained by carrying out the same procedures as described in Example 2 except that prepregs were used without making notches.

In the periphery of the molded article, the woven textile was overlapped in a portion where almost no resin was found and hence carbon fiber was raised on the surface and separated by rubbing with cloth.

Consequently, the molded article was a defective unit.

TABLE 1

| Prepreg | Matrix resin | Reinforcing fiber | Vf (vol. %) |
|---|---|---|---|
| A1 | Polycarbonate | Glass cloth (Unitica, H201 FT) | 55 |
| A2 | Polyetherether ketone | Carbon cloth (Toray, #6343) | 60 |
| B1 | Polycarbonate | Glass yarn (Unitica, G150 1/0 1Z) | 50 |
| B2 | Polyetherether ketone | Carbon yarn (Toray, Toreca T 300-3000-40A) | 50 |

What is claimed is:

1. A process for preparing a fiber-reinforced thermoplastic article comprising stacking at least one prepreg A comprising a woven reinforcing fiber impregnated with a thermoplastic resin and containing at least one notch, and at least one sheet prepreg B comprising a unidirectionally arranged reinforcing fiber impregnated with a thermoplastic resin and containing at least one notch in a direction traversing said fiber; and molding said prepregs to form a fiber-reinforced thermoplastic article.

2. The process of claim 1 wherein said thermoplastic resin is selected from the group consisting of polystyrene, polypropylene, polyethylene, AS resin, ABS resin, polyacrylonitrile-polystyrene-polyacrylate resin, polymethyl methacrylate, nylon, polyacetal, polycarbonate, polyethylene terephthalate, polybutylene terephthalate, polyphenylene oxide, fluoro resin, polyphenylene sulfide, polysulfone, polyether sulfone, polyether ketone, polyether ether ketone, polyimide and polyacrylate.

3. The process of claim 1 wherein said reinforcing fibers are selected from the group consisting of yarns, glass fibers, nylon resins, carbon fibers, aramid fibers and silicon carbide fibers.

4. The process of claim 1 wherein each notch of Prepreg A and Prepreg B has a length no greater than about one-half the maximum length of said prepreg.

5. The process of claim 1 wherein said prepregs each contain no greater than about 1100 notches per square meter of prepreg.

6. The process of claim 1 wherein said prepreg A and said prepreg B each contain notches having a length of from about 2 mm to about 10 mm arranged such that the distance between adjacent notches is from about 2 mm to about 30 mm, said notches forming rows wherein adjacent rows are separated by a distance of from about 5 mm to about 100 mm.

7. The process of claim 1 wherein said prepreg A and prepreg B are alternately stacked.

8. The process of claim 1 wherein said prepreg A and prepreg B are stacked in a manner such that the notches in said prepregs do not coincide with each other.

9. The process of claim 1 wherein molding is carried out by a stamp molding process.

10. The process of claim 1 wherein molding is carried out by a press molding process.

11. The process of claim 1 wherein molding is carried out by an autoclave molding process.

12. The process of claim 1 wherein said woven reinforcing fiber of prepreg A is a woven textile having a weave selected from the group consisting of plain weave, satin weave and diagonal weave.

13. The process of claim 1 wherein said woven reinforcing fiber of prepreg A is selected from the group consisting of glass cloth and carbon cloth.

14. The process of claim 1 wherein the reinforcing fiber of prepreg B is selected from the group consisting of glass yarn and carbon yarn.

* * * * *